United States Patent [19]
Turunen

[11] Patent Number: 5,092,113
[45] Date of Patent: Mar. 3, 1992

[54] APPARATUS FOR GATHERING BERRIES FROM BUSHES

[76] Inventor: Jorma Turunen, Mustikkatie 8, SF-80330 Reijola, Finland

[21] Appl. No.: 685,980

[22] Filed: Apr. 15, 1991

Related U.S. Application Data

[63] Continuation of Ser. No. 485,332, Feb. 26, 1990, abandoned.

[51] Int. Cl.⁵ ............................................ A01D 46/26
[52] U.S. Cl. .......................................... 56/330; 193/7
[58] Field of Search ............... 56/328.1, 329, 330, 56/340.1; 193/7, 27

[56] References Cited

U.S. PATENT DOCUMENTS

| | | | |
|---|---|---|---|
| 3,385,042 | 5/1968 | Christie et al. | 56/330 |
| 3,449,895 | 6/1969 | Pertics | 56/330 |
| 3,601,965 | 8/1971 | Kaessboher | 56/330 |
| 4,456,113 | 6/1984 | Thibault | 193/7 |

FOREIGN PATENT DOCUMENTS

| | | | |
|---|---|---|---|
| 832794 | 2/1985 | Finland | |
| 2248779 | 5/1975 | France | 56/330 |
| 2287841 | 5/1976 | France | 56/330 |
| 2315221 | 1/1977 | France | 56/330 |

Primary Examiner—David J. Bagnell
Attorney, Agent, or Firm—Andrus, Sceales, Starke & Sawall

[57] ABSTRACT

Apparatus for gathering berries, such as raspberries, from bushes has a transport base which is movable along the ground adjacent to the berry bushes. Shaking members are disposed on the transport base to shake the bushes. Rotating, plate-like recovery members formed of soft material form a path through which the bushes pass. Inclined baffle-like guides guide berries shaken from the bushes to a conveyor for transport to storage means.

5 Claims, 2 Drawing Sheets

APPARATUS FOR GATHERING BERRIES FROM BUSHES

The present application is a continuation application of co-pending U.S. patent application Ser. No. 07/485,332, filed Feb. 26, 1990, and now abandoned.

The present invention concerns an apparatus for gathering berries from bushes.

Berry gathering apparatuses are known at present which in the first place are suitable for use in gathering only comparatively firm berries, such as currants, from bushes because said apparatuses rather tend to crush berries and to damage branches of the bushes. Raspberries for instance are so prone to being crushed that no apparatus of prior art is suitable for gathering them. It is in particular the dropping and likely crushing of ripe raspberries that cause problems in their mechanical harvesting.

The object of the present invention is to eliminate the drawbacks that have been mentioned. The object of the invention is particularly to provide a novel apparatus for gathering berries from bushes which is also suitable for recovering and transporting berries which are likely to drop end to be crushed, and which are soft, and which also handles the stalks of the berry bushes in a gentle way.

The invention is based on a apparatus which is constructed on a transporting base and transportable over the ground, provided with berry stalk shaking members, berry recovery members and a conveyor for transporting the berries to a berry container.

As taught by the invention the recovery members are rotating, disk-like or plate-like members which in the region of their margins are suitably resilient, e.g. made of plastic or rubber as to their marginal parts, or entirely. The recovery members further define a gorge-like interspace for the stalks of the berries so that the recovery members will become positioned on both sides of the berry bush. The recovery members may be suitably disposed to shake the berries that have dropped down on them e.g. by making the members move reciprocatingly in the direction of their axis and/or at an oblique or right angle against their axis and/or to rotate reciprocatingly and/or by endowing the margins of the plate-shaped recovery members with an undulating shape or with a shape otherwise deviating from circular. The shaking motion may be produced e.g. by the aid of eccentric shaft or shape of the rotating recovery member, by the aid of a guiding surface which is undulating in the axial direction or otherwise produces a reciprocating motion, with the aid of a means operating with the aid of a cam, a displacement member e.g. a mechanical or pressurized fluid operated means. However, it is equally possible that the recovery members merely rotate freely against the stalks of the bush, without any shaking motion, in which case they do not in any way rub against the stalks and, instead, merely lean against the stalks and efficiently gather all the berries which drop down around the stalks.

The apparatus of the invention further comprises a conveyor, suitably placed below the recovery members, e.g. a conventional belt conveyor or any other conveyor. The recovery members have been arranged to guide the berries down on the conveyor.

In an embodiment of the invention, the apparatus includes inclined, e.g. board-like, net-like or equivalent guides, placed above the conveyor, for guiding the berries down upon the conveyor and/or the recovery members, which may be plate-like. The guides have been placed in different planes, inclined against each other and intercalating with each other, and arranged to guide the berries from upon one guide onto another and, finally, onto the conveyor.

The means further comprises shaking members which have been arranged to shake the stalks of berry bushes, such as raspberry bushes. The shaking members advantageously comprise two vertical rows of arms mounted upon each other and located on both sides of the bush row that is passing through the machine in such way that they shake the bushes from both sides and at different heights.

In the embodiment here presented, recovery members $2,2^1$ have been disposed on either side of the berry bushes 9, and conveyors $3,3^1$ close to the ground. In addition, above the conveyors and recovery members are respectively provided shaking members $18,18^1$, consisting of arm arrays located over each other. The recovery members $2,2^1$, the conveyors $3,3^1$ and the shaking members $18,18^1$ define a gorge-like interspace 4 so that the berry bushes 9 are located in said interspace with the foregoing elements on either side of them. The berry bush 9 can then be shaken from both sides, and the berries dropping on both sides can be gathered and recovered on the conveyors.

Figure 1:
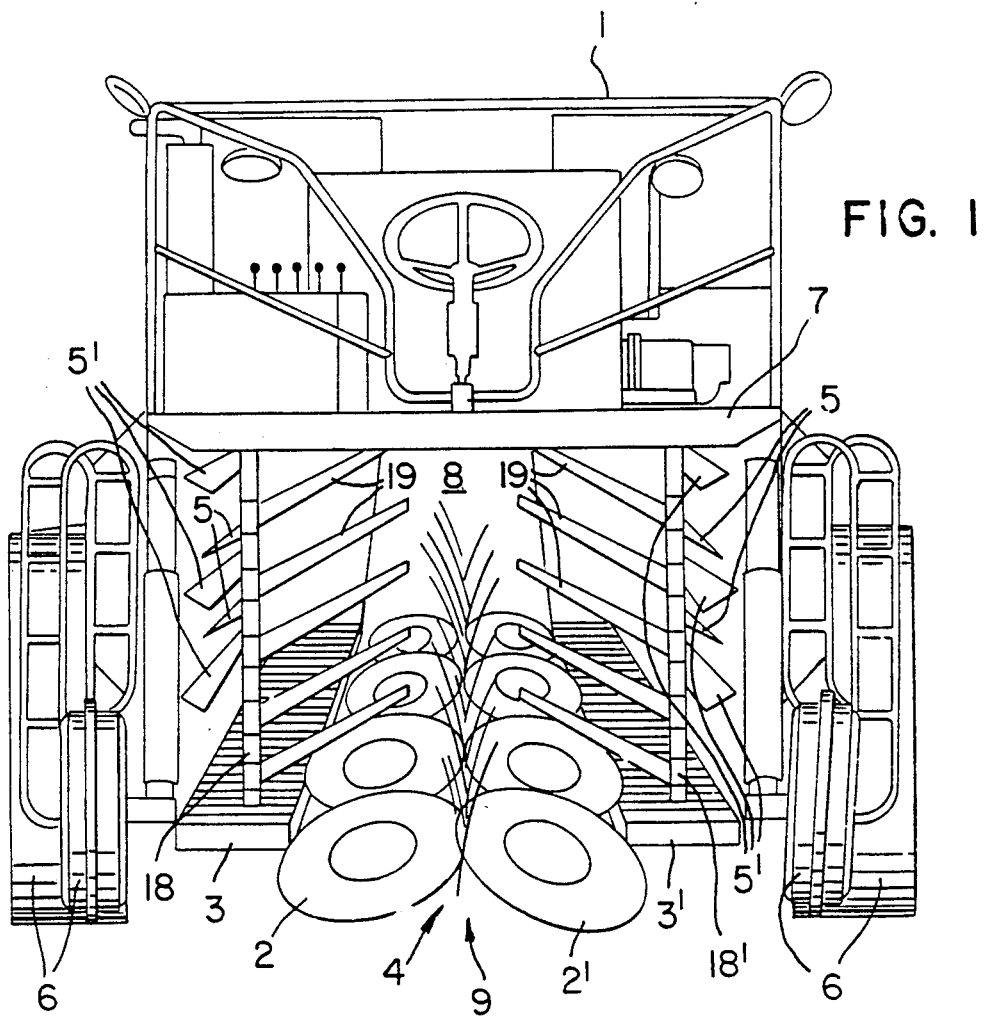
FIG. 1 is a front view of the berry gathering apparatus of the present invention.

In FIG. 1 above the conveyors $3,3^1$ have been disposed inclined guides 5 for guiding the berries down onto the conveyors. Upon each conveyor $3,3^1$ have been placed two inner guides 5 arranged stepwise, in different planes and over each other, and three outer guides $5^1$ arranged stepwise, in different planes and over each other. The inner and outer guides placed over each conveyor have further been mounted so as to be inclined against each other and to alternate in intercalation so that the berries will run from one guide to the other and, finally, onto the conveyor. Hereby the berries will be gently handled, and the berries will remain maximally intact.

In the apparatus depicted in FIG. 1 the shaking members $18,18^1$, which have been disposed on both sides of the gorge-like interspace 4, consist on either side of said interspace of five arms substantially in a horizontal plane, lying over each other and pivoted to a vertical support upon the conveyor and recovery members. The arms are in a suitable way arranged to move reciprocatingly and to strike with suitable gentleness against the bushes in the space 4 and against their branches, preferably different arms at different times and possibly at different frequencies.

Figure 2:
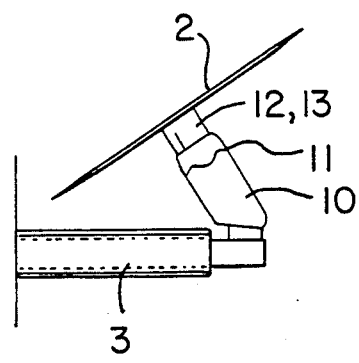
FIG. 2 is a fragmentary, front enlarged view showing a recovery member of the berry gathering apparatus.

In FIG. 2 is seen a recovery member belonging to the means of FIG. 1, as seen from the front and enlarged. The recovery member is round, plate-like and resilient of its marginal parts. The recovery member is carried to be freely rotatable on the shaft 12, but it may also be coupled with a drive means by the aid of which the recovery member is rotated. In the embodiment depicted here the shaft is provided with a shaft sleeve 13, which is on the one hand non-rotatably supported by the shaft and the recovery member and on the other hand is slidably carried to rest against a guide sleeve 10 by mediation of wavy end faces 11 of the shaft and guide sleeves so that the recovery member as it rotates derives a vibratory motion from said wavy surfaces or e.g. from guide members of some other kind.

As shown in FIG. 1, the plate-like recovery members 2,2¹ have been disposed in two rows and partly intercalating, so that they define between themselves a gorge-like interspace 4 for the berry bushes 9. The conveyors 3,3¹ are placed under the plate-like recovery members, inclined outward relative to the interspace 4, and at the same time relative to the belt conveyors, over these. The conveyors have been arranged to direct the berries forward for further transport to storage, e.g. into a berry container.

Figure 3:
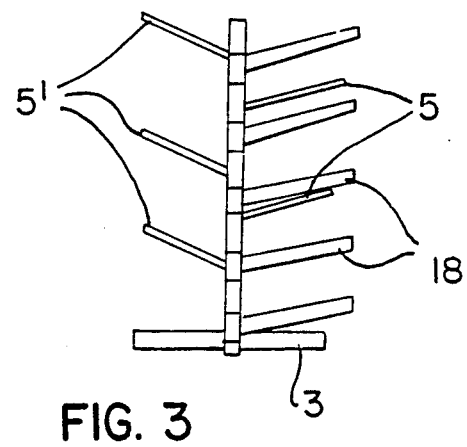
FIG. 3 is a fragmentary view showing the guide and shaking members of the berry gathering apparatus.

In FIG. 3 are presented the baffle-like guides 5 and 5¹ of FIG. 1, schematically and viewed straight from one end. The figure reveals the way in which the guides are located, stepped and in different planes and arranged one above the other over the conveyor 3 so that the inner guides 5 and the outer guides 5¹ are inclined towards each other in alternation so that the berries will run down from one guide onto the other and, finally, onto the conveyor 3. The entity of FIG. 3 advantageously constitutes a separate, detachably mountable assembly and there may be a plurality of such assemblies provided with arms of different kinds so that in each instance among said assemblies that one may be chosen which best meets the requirements imposed as regards the handling of the bushes and berries to be processed.

Figure 4:
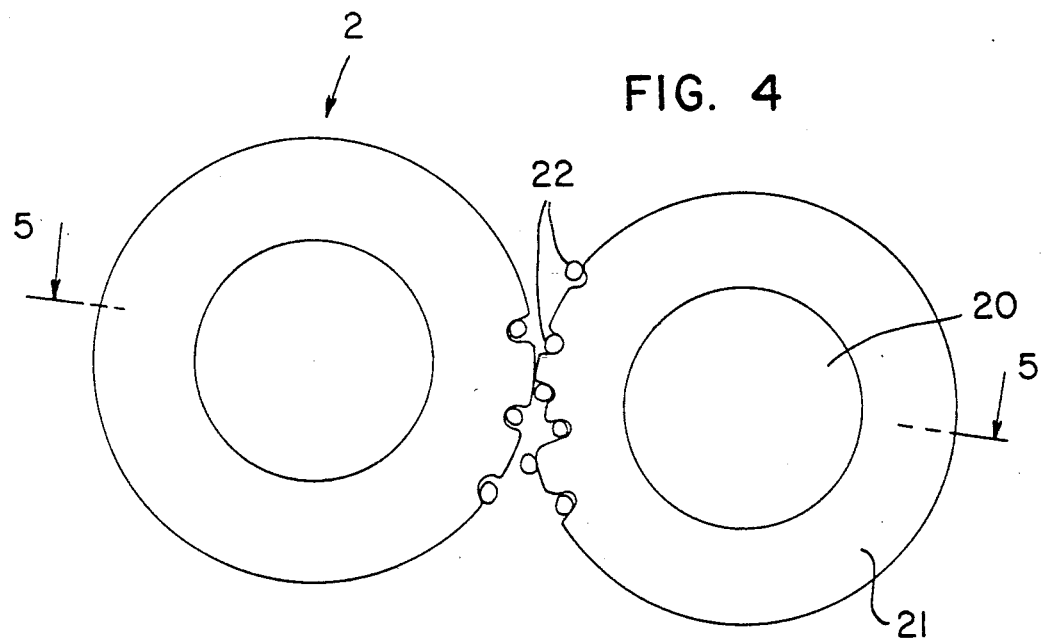
FIG. 4 is a fragmentary plan view showing the recovery members of the invention.
Figure 5:
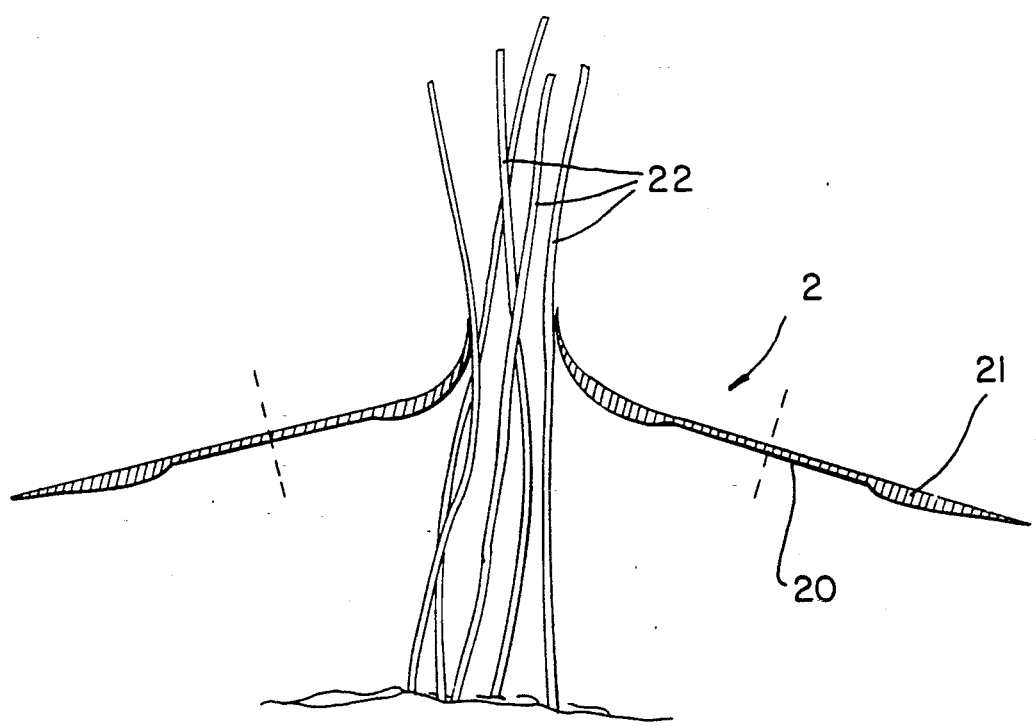
FIG. 5 is a cross-sectional view taken generally along the line 5—5 of FIG. 4.

FIGS. 4 and 5 present more closely the plate-like and resilient recovery members 2 of the invention. The recovery members comprise a rigid and sheet-like, round central part and encircling this, a ring-shaped marginal part 21 e.g. of soft rubber, these parts together constituting a plate-like recovery member, which leans on the set of stalks 22 of the berry bush.

The resilient marginal part bends, as shown in FIG. 5, pressing against the stalks and possibly also shaking them. At the same time, as seen in FIG. 4, it extends into the interval between individual stalks, towards the opposite recovery member and thereby, owing to their resilient and elastic structure, the recovery members also cover the spaces between stalks substantially completely for the duration of the shaking operation. In this way, nearly all berries which drop off are recovered and no berries can fall to the ground between the stalks.

As can be seen in FIG. 5, the resilient marginal part 21 is advantageously tapering in thickness from the centre towards the rim, whereby its very outermost margin can be made exceedingly thin, that is, such that it handles the stalks gently and presses close into the stalk intervals.

I claim:

1. Apparatus for gathering berries from bushes having stalks comprising:

transport means movable on the ground, relative to the berry bushes;

shaking members disposed on said transport means to shake the stalks of the berry bushes;

rotating plate-like recovery members mounted on said transport means so as to define a gorge-like interspace through which the stalks may pass, each of said recovery members having a ring-shaped region of soft material covering a substantial area portion of the recovery member and extending inwardly from the rim of the recovery member;

a conveyor mounted on said transport means close to the ground and arranged to receive and transport berries; and inclined baffle-like guides mounted on said transport means above said conveyor, said guides being positioned stepwise in different generally horizontal planes, said guides being intercalated with each other and arranged with alternating opposite inclinations to sequentially guide berries from one guide to another and finally on to said conveyor.

2. Apparatus according to claim 1, wherein the region of each recovery member comprising soft material is a sheet-like, flexible, resilient ring increasing in thickness inwardly from the rim of the plate-like recovery member.

3. Apparatus according to claim 1, wherein the plate-like recovery members are formed entirely of a resilient and flexible material.

4. Apparatus according to claim 1, wherein the plate-like recovery members are provided with means for imparting a shaking motion to the recovery members.

5. Apparatus according to claim 1, wherein the shaking members have arms for shaking the stalks of the berry bushes, and wherein the physical characteristics of said arms may be selected in accordance with the requirements imposed by the particular berry bushes to be processed.

* * * * *